(No Model.)
J. R. PERKINS.
ADJUSTABLE SUPPORT FOR MIRRORS OR SIMILAR OBJECTS.
No. 406,534. Patented July 9, 1889.
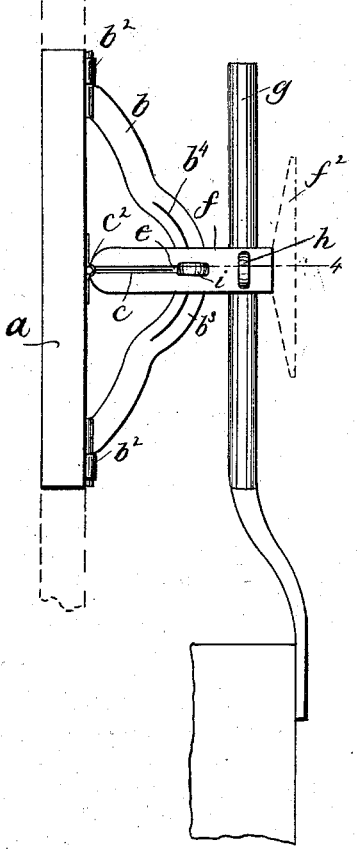
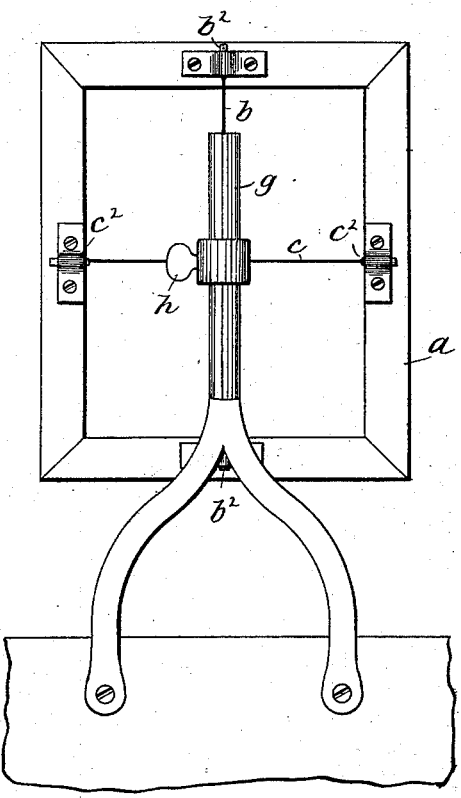
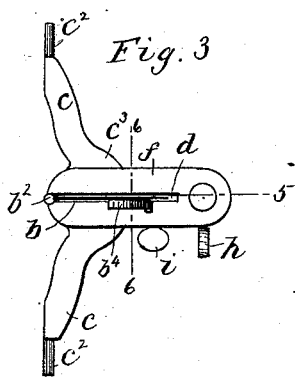
Witnesses,
Jas. K. Maloney.
H. J. Docke.
Inventor,
John R. Perkins,
by Jno. P. Livermore
Att'y.

UNITED STATES PATENT OFFICE.

JOHN R. PERKINS, OF MILFORD, NEW HAMPSHIRE.

ADJUSTABLE SUPPORT FOR MIRRORS OR SIMILAR OBJECTS.

SPECIFICATION forming part of Letters Patent No. 406,534, dated July 9, 1889.

Application filed March 11, 1889. Serial No. 302,747. (No model.)

*To all whom it may concern:*

Be it known that I, JOHN R. PERKINS, of Milford, county of Hillsborough, and State of New Hampshire, have invented an Improvement in Adjustable Supports for Mirrors or Similar Objects, of which the following description, in connection with the accompanying drawings, is a specification, like letters on the drawings representing like parts.

My invention relates to a support for mirrors or similar objects, and is intended to produce a support or holder that will sustain the mirror firmly and securely in any desired position, and at the same time secure the desired adjustment in inclination of the mirror in either a horizontal or vertical plane. The mirror-frame or other object to be supported has connected with it by pivotal or hinged joints and arranged transversely to one another two supporting-arms, which work in corresponding guides in a block or bracket, itself supported in any suitable manner, said block and bracket and arms being so combined and arranged that the pivoted supporting-arms for the frame serve to sustain the weight of the mirror or other frame to be adjusted and permit the angular movement of said mirror about the joint-axis of either one of said arms, while the other arm works through its guide in the supporting-bracket.

Figure 1 is a side elevation of a frame and support therefor embodying this invention; Fig. 2, a rear elevation thereof; Fig. 3, a plan view of the supporting device detached from the frame; Fig. 4, a sectional view on line 4, Fig. 1; Fig. 5, a sectional view on line 5, Fig. 3; and Fig. 6 a sectional view on line 6, Fig. 3, of the guide block or bracket.

The frame $a$, which it is desired to support firmly and securely while enabling it to be inclined either up or down or to the right or left at any desired angle, is provided with two supporting-arms $b$ $c$, the former pivoted at $b^2$ on an axis up and down the frame and the latter pivoted at $c^2$ on an axis across the frame and at right angles to the axis $b^2$ of the arm $b$. Both of said arms $b$ and $c$, when used for very small frames, may extend wholly to the edges of the frame, as shown in full lines, Figs. 1 and 2; but they may, if preferred, be connected at any desired point with the back of the frame when larger frames, such as indicated in dotted lines, Fig. 1, are used, it not being necessary that the pivotal points of attachment or hinges should be at the extreme edges of the frame, although the ends of each arm $b$ and $c$ should be connected with the frame at sufficient distance apart to afford a secure and firm support. The arm $b$ has a curved guide portion $b^3$ concentric with the hinged axis $c^2$ of the other arm $c$, which itself has a curved guide portion $c^3$, (best shown in Figs. 3 and 4,) which is concentric with the hinged portion $b^2$ of the arm $b$. The inner periphery of one of said guide portions, as $b^3$, has a larger radius than the outer periphery of the other guide portion $c^3$, so that neither arm interferes with the swinging movement of the other on its hinged axis. The said arms $b$ $c$ have their guide portions $b^3$ $c^3$ work in corresponding guides $d$ and $e$, formed at right angles to one another in the supporting block or bracket $f$, which is itself suitably sustained either by having a foot adapted to be secured to a wall or other surface, as indicated in dotted lines at $f^2$, Fig. 1, or having a guide which works on a standard or upright $g$, which may be supported in any desired manner—as, for example, being screwed upon the back of a table or bureau, as indicated in Figs. 1 and 2. The said bracket $f$ may be adjustable lengthwise and angularly, if desired, upon the bracket $g$, and when suitably adjusted is fastened by a clamp $h$ and remains stationary while the angular adjustment of the mirror on its supporting-arms is being made. The guides $d$ and $e$ of the bracket $f$ retain the guide portions $b^3$ and $c^3$ of the arms in vertical and horizontal planes, respectively, but admit of adjustment of each in its own plane about the axis of the other. For example, if it is desired to tilt the mirror $a$ up or down this is effected by turning the mirror on the hinges $c^2$ of the arm $c$, which remains stationary during the operation, while the guide portion $b^3$ of the arm $b$ moves through its guide in the bracket $f$, said guide portion and arm $b$ being always retained in the vertical plane, but being adjustable in said plane around the axis of the horizontal arm. If the mirror is to be inclined to the right or left it is turned on the hinges $b^2$, while the arm $c$ slips in its guide on the bracket.

The guide portion $b^3$ and $c^3$ of the arms is shown as flattened, each working in a slot in the bracket $f$, such construction retaining each arm in its own plane, and the guide portion $c^3$ of the horizontal arm is shown as made broad, so as to afford a sufficient support for said arm, which practically sustains the weight of the frame $a$, the main function of the arm $b$ being to retain the frame $a$ in whatever angular position it is turned upon the axis $c^2$ of the horizontal arm. When the frame is nearly balanced, the friction of the guide will be sufficient to retain said frame in whatever position it may be placed; but it may, if desired, be fastened at the desired inclination to the vertical plane by a clamp $i$ that engages the arm $b$. The guide portion of said arm $b$ is shown as provided with a lateral rib or flange $b^4$, that engages the corresponding groove in the bracket $f$, and thus prevents the arms from slipping out from the guide-slots $d$ and $e$ of the said brackets, which slots may extend wholly to the end of the bracket next to the rear of the frame. The said guide-flange $b^4$ may be introduced into or removed from its groove when required by turning the said arm $b$ far enough around the axis $c^2$, and when it is turned far enough to withdraw the flange $b^4$ from the groove in the bracket $f$, and the arms $b$ and $c$ may be drawn out from the slots in said bracket. Such movement is, however, beyond the range required for adjustment while the apparatus is in use.

The herein-described device affords a very firm and efficient support for the frame, while admitting of a wide range of adjustability, and while it has been described as intended to support a mirror, it is obvious that it might be used for other analogous purposes—as, for example, for supporting a table or desk top, or an easel or similar object.

I claim—

1. The combination of two supporting-arms, one arranged transversely to the other and having a pivotal or hinged connection with the object to be supported, each of said arms being provided with a guide portion and a supporting-bracket co-operating with the guide portions of said arms, respectively, substantially as described.

2. The combination of the bracket having guide-slots transverse to one another with supporting-arms having pivotal joints at their ends, and each having a guiding-surface flattened to operate in a corresponding slot of the bracket, the said guide portions of each arm being curved concentrically with the pivotal axis of the other arm and the guide portion of one having a larger radius than the guide portion of the other, substantially as and for the purpose described.

3. The combination of the horizontal supporting-bracket $f$, provided with a horizontal guide-slot $e$, with a horizontal supporting-arm $c$, provided with a pivotal joint at each end and with a broad flat curved guiding portion between its ends working in the guide-slot of said bracket, and a vertical arm hinged at its ends and having an intermediate guiding portion working in a guide in said bracket, substantially as described.

4. The combination of the supporting-bracket provided with guides transverse to one another with supporting-arms having intermediate guide portions and provided with pivotal joints at their ends, the guide portion of one of said arms being provided with a rib entering a corresponding groove in the supporting-bracket for retaining said supporting-arms in engagement with the bracket, substantially as described.

In testimony whereof I have signed my name to this specification in the presence of two subscribing witnesses.

JOHN R. PERKINS.

Witnesses:
WM. WETHERBEE,
H. S. HUTCHINSON.